United States Patent
Diz et al.

(10) Patent No.: US 6,544,361 B1
(45) Date of Patent: Apr. 8, 2003

(54) PROCESS FOR MANUFACTURING THIN COMPONENTS MADE OF ZIRCONIUM-BASED ALLOY AND STRAPS THUS PRODUCED

(75) Inventors: Jésus Diz, Lyons (FR); Gérard Bunel, Echauffour (FR)

(73) Assignees: Framatome ANP, Courbevoie (FR); Cezus, Courbevoie (FR)

( * ) Notice: Subject to any disclaimer, the term of this patent is extended or adjusted under 35 U.S.C. 154(b) by 0 days.

(21) Appl. No.: 09/913,509

(22) PCT Filed: Feb. 14, 2000

(86) PCT No.: PCT/FR00/00357

§ 371 (c)(1),
(2), (4) Date: Aug. 15, 2001

(87) PCT Pub. No.: WO00/48199

PCT Pub. Date: Aug. 17, 2000

(30) Foreign Application Priority Data

Feb. 15, 1999 (FR) .............................................. 99 01777
Mar. 30, 1999 (FR) .............................................. 99 03955

(51) Int. Cl.[7] .................................................. C22F 1/18
(52) U.S. Cl. ...................... 148/672; 148/421; 376/342; 376/438; 376/462
(58) Field of Search ................ 148/672, 421; 376/342, 438, 462

(56) References Cited

U.S. PATENT DOCUMENTS

| 4,992,240 | A | | 2/1991 | Komatsu et al. | |
|---|---|---|---|---|---|
| 5,832,050 | A | * | 11/1998 | Rebeyrolle et al. | 376/457 |
| 6,332,012 | B1 | * | 12/2001 | Petit | 376/352 |
| 6,340,536 | B1 | * | 1/2002 | Noe et al. | 148/407 |

FOREIGN PATENT DOCUMENTS

| EP | 0 246 986 | 10/1988 |
|---|---|---|
| EP | 0 720 177 | 7/1997 |
| FR | 2575764 | 7/1986 |
| FR | 2624136 | 1/1991 |
| JP | 59-025963 | 2/1984 |

* cited by examiner

Primary Examiner—John Sheehan
Assistant Examiner—Andrew L. Oltmans
(74) Attorney, Agent, or Firm—Kenyon & Kenyon

(57) ABSTRACT

The present invention relates to a method for making flat, thin elements which consist of: producing a zirconium alloy blank also containing, besides the inevitable impurities, 0.8 to 1.3% of niobium, 1100 to 1800 ppm of oxygen, and 10 to 35 ppm of sulfur; carrying out a β hardening and hot rolling to obtain a blank and performing on it at least three cold rolling passes with intermediate annealing heat treatments. One of the intermediate heat treatments is performed for a duration of at least 5 hours at a temperature less than 560° C. and all the optional treatments subsequent to the long treatment are carried out at a temperature of less than 620° C. for not more than 15 minutes.

13 Claims, 2 Drawing Sheets

PROCESS FOR MANUFACTURING THIN COMPONENTS MADE OF ZIRCONIUM-BASED ALLOY AND STRAPS THUS PRODUCED

The invention relates to processes for manufacturing thin components made of a zirconium-based alloy which are intended to be used in water-cooled nuclear reactors and especially, among these, in pressurized-water reactors.

One particularly important application of the invention is in the manufacture of sheets intended to be cut so as to form structural components of the backbone of a nuclear fuel assembly and especially to form spacer grid straps for the fuel rods.

Such structural components are required to have, simultaneously, good resistance to the coolant, consisting of a high-temperature aqueous medium, low free growth in the direction of the large dimension of the component, and reduced creep in the case of components subjected to stresses. In addition, the manufacturing process must not result in a high scrap rate.

The aim of the invention is especially to provide a process allowing these objectives to be achieved, especially by avoiding the presence of the βZr phase which has an unfavorable effect from the oxidation standpoint. The aim of the invention is also, secondarily, to provide a process employing a zirconium-based alloy that can also be used to form cladding tubes, which are in contact not only with the aqueous medium but also with the fuel.

Tubes have already been proposed (EP-A-0 720 177) which are made of a zirconium-based alloy also containing 50 to 250 ppm iron, 0.8 to 1.3 wt % niobium, less than 1600 ppm oxygen, less than 200 ppm carbon and less than 120 ppm silicon. Such an alloy is drawn and then cold-rolled in at least four passes (the term "rolling" denoting, in the case of tube, passage over a mandrel against which the blank is pressed by forming rolls), in several passes, with intermediate heat treatments between 560° C. and 620° C.

At these relatively low temperatures, advantageous from the standpoint of corrosion resistance, recrystallization of the alloy, necessary for the next rolling pass to be carried out properly, requires a long time.

A process according to the invention makes it possible to produce flat thin structural components by a process that can be employed on a continuous line. According to this process, a blank made of a zirconium-based alloy is formed, said alloy also containing, by weight, beside the inevitable impurities, 0.8 to 1.3% niobium, 500 to 2000 ppm oxygen and 5 to 35 ppm sulfur and, optionally, Fe, Cr and V with a total content of less than 0.25% and tin with a content of less than 300 ppm. A blank, resulting from a β hardening operation and a hot-rolling pass, is rolled in at least three cold-rolling passes with intermediate annealing heat treatments, one of these intermediate heat treatments or a prior heat treatment before the first cold-rolling pass being carried out for a long time, of at least 2 hours, at a temperature below 600° C., and all the optional heat treatments which follow the long treatment being carried out at a temperature generally between 610 and 620° C. for at most 15 min, in general 2 to 10 min.

Often 1100 to 1800 ppm oxygen and 10 to 35 ppm sulfur will be used.

One advantage of "short" treatments of at most 15 min is that they can be carried out in continuous furnaces. However, they may be at a temperature causing the βZr phase to appear, since this phase will be eliminated by the "long" treatment.

In a first method of implementation, the number of cold-rolling passes is only three. The first intermediate heat treatment is at a temperature exceeding 620° C., causing the βZr phase to appear, and of short duration, compatible with the use of continuous furnaces. On the other hand, the treatment which immediately precedes the final rolling is at a low temperature, below 600° C., and of a duration exceeding 2 hours, which can be carried out in a bell furnace. This operation eliminates practically all the βZr phase. A treatment below 560° C. is especially possible, with a duration which then exceeds 5 hours.

In a second method of implementation, four cold-rolling passes are carried out with short intermediate annealing operations between the first two or first three passes at a temperature resulting in the appearance of the βZr phase. The βZr phase is then eliminated by a long annealing operation (more than 2 hours) at a temperature below 600° C. before the final or penultimate rolling, depending on the case. An annealing operation of more than 5 hours below 560° C. allows a similar result to be achieved.

In yet another case, the process comprises four (or more) cold-rolling passes and the treatment of long duration at a temperature below 600° C. (often below 560° C.) is carried out immediately after hot rolling. All the subsequent annealing operations are below 620° C., short (less than 15 min) and carried out in a continuous furnace.

In all cases, a final recrystallization annealing operation is carried out at a temperature low enough to prevent the βZr phase from appearing, that is to say below 620° C.

The thin component thus obtained constitutes a sheet which no longer undergoes thermometallurgical treatment before use, but simply planishing, pickling, inspection and, finally, cutting operations.

The manufacture may be carried out with continuous annealing furnaces for all the short heat treatments at high temperature. The annealing operation to eliminate the βZr phase requires only a time of several hours, typically 5 to 15 h, between 520 and 580° C., for example in a bell furnace.

All of the heat treatments are carried out in an inert atmosphere or under vacuum.

The presence of sulfur with a low content improves the hot creep in an aqueous medium. An oxygen content of between 1000 and 1600 ppm is advantageous. It may be adjusted by a deliberate and controlled addition of zirconium.

The alloy used also lends itself to the formation of claddings, by a process involving several rolling passes in a pilger rolling mill, this time with long intermediate heat treatments at a temperature low enough not to make the βZr phase appear.

The same alloy containing 5 to 35 ppm (especially 10 to 35 ppm) sulfur consequently makes it possible to form, from ingots of the same composition, both flat components cut from a sheet and cladding tubes or nuclear fuel assembly guide tubes.

The above characteristics, together with others, will become more clearly apparent on reading the description which follows of particular methods of implementation, these being given by way of nonlimiting examples. The description refers to the drawings which accompany it, in which.

Figure 4:
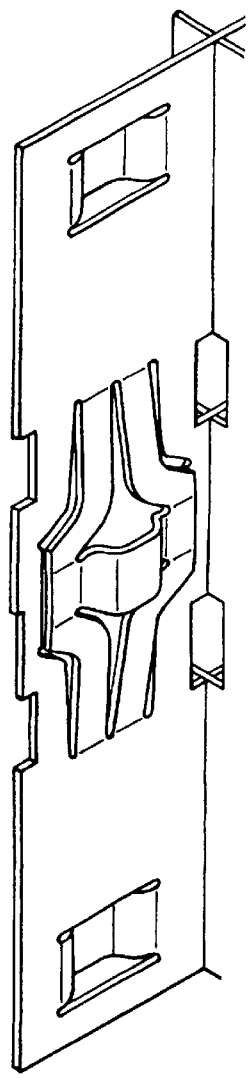
FIG. 4 shows schematically a fragment of a grid strap that can be produced according to the invention.

The process, the steps of which are illustrated in the figures, was used to form sheets from 0.4 mm to 0.6 mm in thickness, intended to form, by cutting and press-drawing, grid straps having openings for housing a spring, of the kind shown for example in FIG. 4. However, the springs may be formed by drawn parts of the straps.

The manufacturing process firstly comprises the casting of an ingot having the required composition. Heterogeneities result in some cases in an ingot, portions of which, especially the ends and sometimes the peripheral parts, have a content which lies outside the permitted ranges. In this case, the corresponding parts are removed by cutting.

The products studied form particular examples, for which a niobium content of between 1.01 and 1.03%, a sulfur content of between 15 and 28 ppm and an oxygen content of 1280 to 1390 ppm was obtained. For all the other elements present as impurities, the contents were less than the following values:

| ELEMENT | | max. (ppm) |
|---|---|---|
| Aluminum | Al | 75 |
| Boron | B | 0.5 |
| Cadmium | Cd | 0.5 |
| Calcium | Ca | 30 |
| Carbon | C | 100 |
| Chlorine | Cl | 20 |
| Chromium | Cr | 150 |
| Cobalt | Co | 10 |
| Copper | Cu | 50 |
| Hafnium | Hf | 100 |
| Hydrogen | H | 25 |
| Iron | Fe | 500 |
| Lead | Pb | 130 |
| Magnesium | Mg | 20 |
| Manganese | Mn | 50 |
| Molybdenum | Mo | 50 |
| Nickel | Ni | 70 |
| Nitrogen | N | 80 |
| Phosphorus | P | 20 |
| Silicon | Si | 120 |
| Sodium | Na | 20 |
| Tantalum | Ta | 100 |
| Tin | Sn | 100 |
| Titanium | Ti | 50 |
| Tungsten | W | 100 |
| Uranium (total) | U | 3.5 |
| Vanadium | V | 50 |

Starting from an ingot, a thick sheet bar was manufactured, by rolling, the thickness of which was 100 mm in the case studied. A rolling pass 10 carried out hot, generally between 930 and 960° C., brought this sheet bar to a thickness of 30 mm. After rolling, the product underwent a β hardening operation 12, generally from a temperature of between 1000° C. and 1200° C., giving a blank. The blank then underwent a new hot-rolling pass 14, typically between 770 and 790° C.

All these operations are common to all the methods of implementing the invention.

EXAMPLE 1
(FIG. 1)

In this case, three cold-rolling passes were carried out. The hot-rolling pass 14 was followed by two first cold-rolling passes $16_1$ and $16_2$ between which an annealing operation $18_1$ was carried out in a continuous annealing furnace which allowed only a temperature soak for a time not exceeding 15 min, generally about two to ten minutes. This required a high temperature, of between 690° C. and 710° C.—that is to say above the α/α,β transition temperature. Going to these high temperatures results in the appearance of βZr phases, which must subsequently be eliminated almost completely in order to improve the oxidation resistance of the sheet.

The annealing operation $18_1$ was carried out at about 700° C. for a time of around 4 min.

On the other hand, the annealing operation 20 to eliminate the βZr phase was carried out in a bell furnace for 10 to 12 hours, off line, at a nominal temperature of 550° C.

The final cold-rolling pass $16_3$ was followed by a recrystallization annealing operation 24 carried out below 620° C. in order not to make the βZr phase appear in a significant amount. In practice, this annealing operation may be carried out in a continuous furnace, by a soak for two to ten minutes at 610° C. to 620° C.

The sheet obtained as a result of the annealing operation 24 was used without any further heat treatment. It was subjected to the usual pickling and inspection operations, then cut and drawn in order to form therein springs, if necessary, or to place therein attached springs made of another material, such as a nickel-based alloy.

EXAMPLE 2
(FIG. 2)

The process of example 2 comprises four cold rolling-passes. It was used to form sheets 0.425 to 0.6 mm in thickness.

For both the desired thicknesses, four cold-rolling passes $16_0$, $16_1$, $16_2$ and $16_3$ were carried out. The intermediate continuous annealing operations $18_0$ and $18_1$ were carried out at 700° C. But this time, the long heat treatment 26 at low temperature (below 560° C.) preceded the last two cold-rolling passes $16_2$ and $16_3$. The heat treatment $18_2$ was below 620° C., for example at a nominal temperature of 610° C., for a few minutes. The final recrystallization annealing operation 24 may also have been carried out at 615° C. for a few minutes, in a continuous furnace.

Figure 1:
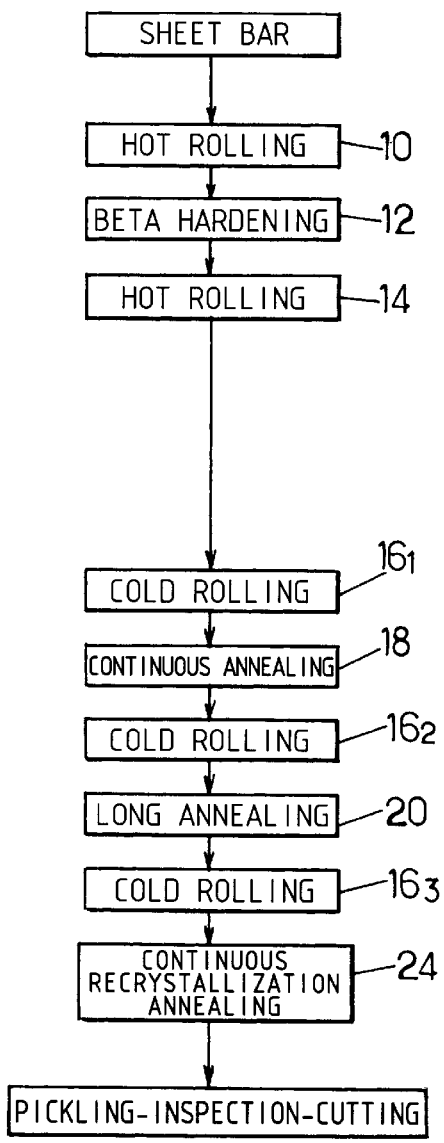
FIGS. 1 to 3 are flowcharts for the manufacture of sheet intended for nuclear-fuel assembly grid straps.
Figure 2:
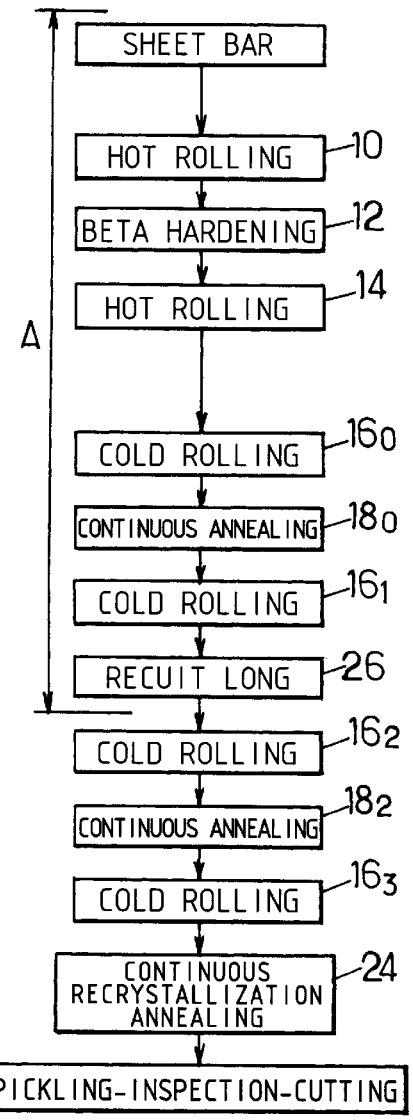

All the operations indicated at A in FIG. 2 are the same for the two desired final thicknesses. The following cold-rolling passes were carried out with suitable deformation ratios.

In a variant, it is the cold-rolling pass $16_2$ which is followed by the annealing operation intended to eliminate the βZr phase almost completely. To do this, the annealing operation is carried out below 620° C. Annealing for 5 to 15 hours, at 520° C. to 580° C., gives good results.

The above process is capable of variants. The number of cold-rolling passes may be increased. The annealing operation 26 to eliminate the βZr phase may be carried out at a lower temperature provided the duration is longer.

EXAMPLE 3
(FIG. 3)

Figure 3:
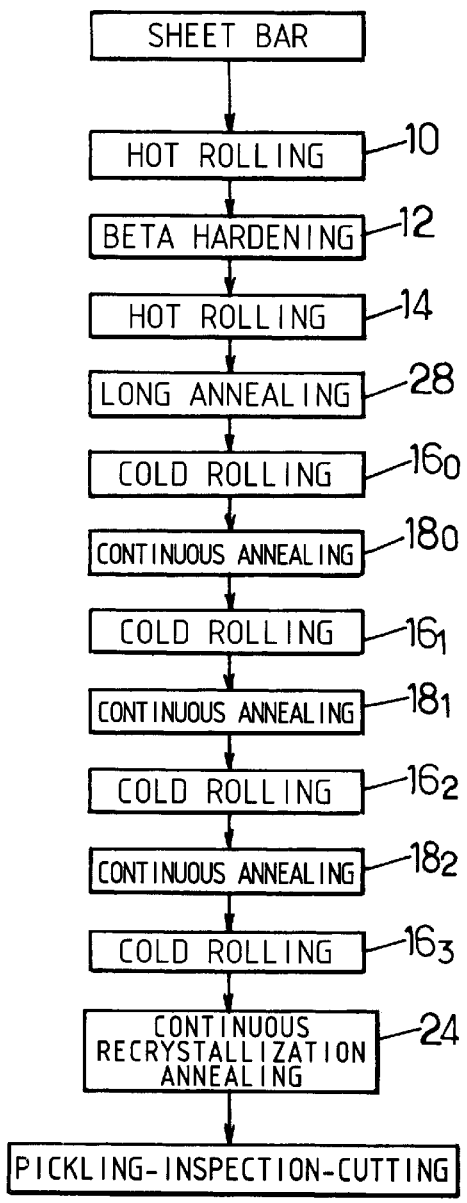

In yet another method of implementation, four cold-rolling passes were provided. However, the low-temperature annealing operation 28 of long duration, to eliminate the βZr phase, preceded the cold-rolling passes. In this case, the following temperatures were especially used (the references being those of FIG. 3):

| | |
|---|---|
| Hot rolling pass 14: | 770–790° C. |
| Long annealing 28 to eliminate βZr: | 550° C. (below the phase change temperature) for 10 to 12 hours |
| Continuous annealing operations $18_0$, $18_1$, $18_2$: | 610° C. at a speed of 0.6 to 1 m/min, resulting in a duration of about 3 to 4 min. |
| Annealing 24: | 615° C., for a few minutes, in a continuous furnace. |

The sheets obtained by the process according to the invention were subjected to metallurgical examinations and to tests.

The intermetallic precipitates were finely and uniformly distributed. Electron microscope examinations showed a few alignments of βNb precipitates due to the annealing operations 18. In contrast, the βZr precipitates were present as traces and were isolated.

The measured Kearns factors for the 0.425 mm thick sheet were 0.09 in the longitudinal rolling direction, 0.23 in the transverse direction and 0.68 in the normal direction: they were very comparable to those of recrystallized Zircaloy 4. Tests were carried out to determine the uniform corrosion under irradiation.

The maximum thickness of oxide formed for a burn-up rate of 62 GWd/t remained less than 27 μm, lower than on guide tubes made of recrystallized Zircaloy 4 and on a sheet made of stress-relieved Zircaloy-4.

The free growth of the sheets manufactured by the process, measured at 350° C., was very close to that of Zircaloy 4 up to a fluence of about $6 \times 10^{20} n/cm^2$. Above this value, a saturation phenomenon was observed, such that the free growth was roughly half that of Zircaloy 4 for a fluence of $25 \times 10^{20} n/cm^2$.

The improvement in hydriding over Zircaloy 4 was also very significant, since the absorbed hydrogen factor was reduced by almost a half.

When it is desired to use the same alloy to manufacture claddings and straps, it is advantageous to incorporate into the alloy 0.03 to 0.25% iron in total, on the one hand, and at least one of chromium and of vanadium on the other hand. The Fe/(Cr+V) ratio is then advantageously at least 0.5. It may also be useful to add tin to improve the strength of the claddings in a lithium-containing medium.

It will be seen that it is possible to place the long heat treatment at various steps in the manufacturing cycle, with the sole condition that no subsequent treatment be provided at a temperature liable to make the βZr phase appear.

What is claimed is:

1. Process for manufacturing flat thin components, in which an alloy consisting, by weight, besides zirconium and the inevitable impurities, of 0.8 to 1.3% niobium, 500 to 2000 ppm oxygen and 5 to 35 ppm sulfur and, optionally, up to 0.25% Fe+Cr+V and up to 300 ppm tin undergoes steps comprising a β hardening operation and a hot-rolling pass in order to obtain a blank and the blank is rolled in at least three cold rolling passes with intermediate annealing heat treatments, one of these intermediate heat treatments or a prior heat treatment before the first cold-rolling pass being carried out for at least 2 hours, at a temperature of between 520° C. and 600° C. and all optional heat treatments which follow the one of the intermediate heat treatments or the prior heat treatment of at least 2 hours being carried out at a temperature below 620° C. for at most 15 min.

2. Process according to claim 1, wherein the number of cold-rolling passes is three, a first of the intermediate heat treatments is at a temperature exceeding 620° C. and of short duration, whereas the treatment which immediately precedes the final rolling pass is at a temperature below 600° C. and has a duration exceeding 2 hours.

3. Process according to claim 2, wherein the first heat treatment is carried out at a temperature of between 690° C. and 710° C. in less than 15 min.

4. Process according to claim 1, wherein four said cold-rolling passes are carried out and short intermediate annealing operations are carried out each before one of the first two or three cold-rolling passes, at a temperature exceeding 620° C., resulting in appearance of βZr phase, and an annealing operation is carried out for more than 2 hours at a temperature below 600° C. before the final rolling pass or the penultimate rolling pass.

5. Process according to claim 1, comprising at least four said cold-rolling passes wherein the one of the intermediate heat treatments or the prior heat treatment which is conducted at a temperature below 600° C. is carried out immediately after the hot rolling.

6. Process according to claim 1, further comprising a final recrystallization annealing operation at a temperature below 620° C., low enough not to make the βZr phase appear.

7. Process according to claim 6, wherein the final recrystallization annealing is carried out between 610° C. and 620° C. for 2 to 10 min.

8. Process according to claim 1, wherein the optional heat treatments are carried out in a continuous furnace.

9. Process according to claim 1, wherein the alloy contains 1100 to 1800 ppm oxygen and 10 to 35 ppm sulfur.

10. Process according to claim 1, wherein one of the intermediate annealing heat treatments, and the prior heat treatment before the first cold-rolling pass is carried out for at least 5 hours, at a temperature below 560° C.

11. Process according to claim 1, wherein the treatment which immediately precedes the final rolling pass is at a temperature below 560° C. and for a time exceeding 5 hours.

12. Process according to claim 1, wherein iron, chromium, vanadium and tin are present only as impurities.

13. Thin nuclear-fuel assembly grid strap cut into thin component manufactured by a process comprising the steps of:

preparing an alloy consisting, by weight, besides zirconium and inevitable impurities, of 0.8 to 1.3% niobium, 500 to 2000 ppm oxygen and 5 to 35 ppm sulfur, no more than 0.25% Fe+Cr+V and no more than 300 ppm tin;

carrying out a β hardening operation and a hot-rolling pass for obtaining a flat blank, and rolling the blank in at least three cold-rolling passes with intermediate annealing heat treatments, wherein one of the intermediate heat treatments or a prior heat treatment before the first cold-rolling pass is carried out for at least 2 hours, at a temperature of between 520° C. and 600° C. and all optional heat treatments which follow the one of the intermediate heat treatments or a prior heat treatment are shorter heat treatments carried out at a temperature below 620° C. for at most 15 min each.

* * * * *